United States Patent
Thiebaut et al.

(10) Patent No.: US 11,968,167 B2
(45) Date of Patent: Apr. 23, 2024

(54) APPARATUS AND METHOD TO FACILITATE NETWORK ADDRESS TRANSLATION SERVICE

(71) Applicant: Nokia Technologies Oy, Espoo (FI)

(72) Inventors: Laurent Thiebaut, Massy (FR); Hannu Flinck, Espoo (FI); Pekka Juhani Korja, Espoo (FI); Hasanin Harkous, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/004,430

(22) PCT Filed: Jul. 6, 2020

(86) PCT No.: PCT/IB2020/056344
§ 371 (c)(1),
(2) Date: Jan. 5, 2023

(87) PCT Pub. No.: WO2022/008951
PCT Pub. Date: Jan. 13, 2022

(65) Prior Publication Data
US 2023/0300104 A1 Sep. 21, 2023

(51) Int. Cl.
*H04L 61/255* (2022.01)
*H04L 101/60* (2022.01)

(52) U.S. Cl.
CPC ........ *H04L 61/255* (2013.01); *H04L 2101/60* (2022.05)

(58) Field of Classification Search
CPC .......................... H04L 61/255; H04L 2101/60
See application file for complete search history.

(56) References Cited

U.S. PATENT DOCUMENTS 11,032,239 B1 * 6/2021 Maria ................ H04L 61/5084
2015/0101009 A1 4/2015 Kolbe et al.
(Continued)

FOREIGN PATENT DOCUMENTS

CN 110048951 A * 7/2019 ............. H04L 45/74
CN 112217653 A * 1/2021 ......... H04L 41/0893
(Continued)

OTHER PUBLICATIONS

"3rd Generation Partnership Project; Technical Specification Group Services and System Aspects; Study on enhancement of support for Edge Computing in 5G Core network (5GC) (Release 17)", 3GPP TR 23.748, V0.3.0, Jan. 2020, pp. 1-40.
(Continued)

*Primary Examiner* — Kostas J Katsikis
(74) *Attorney, Agent, or Firm* — Robert P. Michal, Esq.; Carter, DeLuca & Farrell LLP

(57) ABSTRACT

An apparatus comprising: at least one processor; and at least one memory including computer program code; the at least one memory and the computer program code configured to, with the at least one processor, cause the apparatus at least to: send (800) a registration request comprising a range of addresses and/or ports managed by a network address and/or port translation service and an identifier of the network address and/or port translation service; and receive (804) an address and/or port translation information request comprising an address and/or port used by an application to communicate with a terminal, wherein the address and/or port used by the application to communicate with a terminal is within the range of addresses and/or ports managed by the network address and/or port translation service.

20 Claims, 12 Drawing Sheets

(56) References Cited

U.S. PATENT DOCUMENTS

| | | | |
|---|---|---|---|
| 2018/0069782 A1* | 3/2018 | Wosik | H04L 61/2532 |
| 2018/0083878 A1* | 3/2018 | Francini | H04L 47/30 |
| 2020/0053047 A1* | 2/2020 | Gambhir-Parekh | H04L 12/66 |
| 2020/0195605 A1* | 6/2020 | Koike | H04L 61/4555 |
| 2020/0322780 A1* | 10/2020 | Lauster | H04W 48/16 |
| 2020/0351989 A1* | 11/2020 | Ahmet | H04W 12/03 |
| 2021/0152516 A1* | 5/2021 | Moreno | H04L 61/2575 |
| 2022/0224646 A1* | 7/2022 | Xiong | H04L 45/02 |
| 2023/0217308 A1* | 7/2023 | Sandberg | H04L 41/16 370/235 |
| 2023/0354149 A1* | 11/2023 | Xu | H04L 61/4511 |

FOREIGN PATENT DOCUMENTS

| | | | | |
|---|---|---|---|---|
| WO | WO-2020220747 A1 * | 11/2020 | | H04J 3/0638 |
| WO | WO-2021242151 A1 * | 12/2021 | | G06N 3/0442 |

OTHER PUBLICATIONS

"LS on IP address to GPSI translation", SA WG2 Meeting #S2-139E, S2-2004338, 3GPP TSG SA WG6, Jun. 1-12, 2020, 1 page.

"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.

Audet et al., "Network Address Translation (NAT) Behavioral Requirements for Unicast UDP", RFC 4787, Network Working Group, Jan. 2007, pp. 1-48.

"3rd Generation Partnership Project; Technical Specification Group Core Network and Terminals; 5G System; Network Exposure Function Northbound APIs; Stage 3 (Release 16)", 3GPP TS 29.522, V16.3.0, Mar. 2020, pp. 1-150.

"3rd Generation Partnership Project; Technical Specification Group Core Network and Terminals; 5G System; Binding Support Management Service; Stage 3 (Release 16)", 3GPP TS 29.521, V16.3.0, Mar. 2020, pp. 1-32.

"3rd Generation Partnership Project; Technical Specification Group Services and System Aspects; Procedures for the 5G System (5GS); Stage 2 (Release 16)", 3GPP TS 23.502, V16.4.0, Mar. 2020, pp. 1-582.

"Network address translation", Wikipedia, Retrieved on Jan. 27, 2023, Webpage available at : https://en.wikipedia.org/wiki/Network_address_translation.

"3rd Generation Partnership Project; Technical Specification Group Services and System Aspects; IP Multimedia Subsystem (IMS); Stage 2 (Release 16)", 3GPP TS 23.228, V16.4.0, Mar. 2020, pp. 1-349.

Wing et al., "Port Control Protocol (PCP)", RFC 6887, Internet Engineering Task Force (IETF), Apr. 2013, pp. 1-88.

Cheshire et al., "NAT Port Mapping Protocol (NAT-PMP)", RFC 6886, Independent Submission, Apr. 2013, pp. 1-33.

"APIs and reference", Google Cloud, Retrieved on Jan. 27, 2023, Webpage available at : https://cloud.google.com/nat/docs/apis.

"3rd Generation Partnership Project; Technical Specification Group Core Network and Terminals; 5G System; Network Function Repository Services; Stage 3 (Release 16)", 3GPP TS 29.510, V16.3.0, Mar. 2020, pp. 1-172.

"3rd Generation Partnership Project; Technical Specification Group Core Network and Terminals; 5G System; Principles and Guidelines for Services Definition; Stage 3 (Release 16)", 3GPP TS 29.501, V16.3.0, Mar. 2020, pp. 1-70.

International Search Report and Written Opinion received for corresponding Patent Cooperation Treaty Application No. PCT/IB2020/056344, dated Feb. 10, 2021, 12 pages.

"LS on IP address to GPSI translation", 3GPP TSG-SA WG6 Meeting #37-e, S6-200947, 3GPP TSG SA WG6, May 14-26, 2020, 1 page.

"Support of the mapping from IP addressing information provided to an AF to the user identity", SA WG2 Meeting #140e, S2-2004842, Nokia, Aug. 19-Sep. 1, 2020, 7 pages.

* cited by examiner

US 11,968,167 B2

APPARATUS AND METHOD TO FACILITATE NETWORK ADDRESS TRANSLATION SERVICE

RELATED APPLICATION

This application was originally filed as PCT Application No. PCT/IB2020/056344, filed on Jul. 6, 2020, which is incorporated herein by reference in its entirety.

FIELD OF THE DISCLOSURE

The present disclosure relates to an apparatus, a method, and a computer program for providing an address and/or port used by a core network to communicate with a terminal in order to support an application function in a cellular system.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) or the Universal Mobile Telecommunications System (UMTS) radio-access technology. Another example communication system is so called 5G radio or new radio (NR) access technology.

SUMMARY

According to an aspect there is provided an apparatus comprising at least one processor and at least one memory including computer code for one or more programs, the at least one memory and the computer code configured, with the at least one processor, to cause the apparatus at least to: send a registration request comprising a range of addresses and/or ports managed by a network address and/or port translation service and an identifier of the network address and/or port translation service; and receive an address and/or port translation information request comprising an address and/or port used by an application to communicate with a terminal, wherein the address and/or port used by the application to communicate with a terminal is within the range of addresses and/or ports managed by the network address and/or port translation service.

The address and/or port translation information request may be received from an application function or a network exposure function.

The identifier of the apparatus may be a uniform resource identifier of the address and/or port translation information service.

The at least one memory and the computer program code may be configured to, with the at least one processor, cause the apparatus at least to: retrieve from a local translation table the address and/or port used by a core network to communicate with the terminal corresponding to the address and/or port used by the application to communicate with the terminal; and provide an address and/or port translation information response comprising the address and/or port used by the core network to communicate with the terminal.

The registration request may be sent to a network function repository function.

The apparatus may host the network address and/or port translation service.

The apparatus may be a user plane function or a stand-alone function separate from the user plane function.

According to an aspect there is provided an apparatus comprising means for: sending a registration request comprising a range of addresses and/or ports managed by a network address and/or port translation service and an identifier of the network address and/or port translation service; and receiving an address and/or port translation information request comprising an address and/or port used by an application to communicate with a terminal, wherein the address and/or port used by the application to communicate with a terminal is within the range of addresses and/or ports managed by the network address and/or port translation service.

The address and/or port translation information request may be received from an application function or a network exposure function.

The identifier of the apparatus may be a uniform resource identifier of the address and/or port translation information service.

The apparatus may comprise means for: retrieve from a local translation table the address and/or port used by a core network to communicate with the terminal corresponding to the address and/or port used by the application to communicate with the terminal; and provide an address and/or port translation information response comprising the address and/or port used by the core network to communicate with the terminal.

The registration request may be sent to a network function repository function.

The apparatus may host the network address and/or port translation service.

The apparatus may be a user plane function or a stand-alone function separate from the user plane function.

According to an aspect there is provided an apparatus comprising circuitry configured to: send a registration request comprising a range of addresses and/or ports managed by a network address and/or port translation service and an identifier of the network address and/or port translation service; and receive an address and/or port translation information request comprising an address and/or port used by an application to communicate with a terminal, wherein the address and/or port used by the application to communicate with a terminal is within the range of addresses and/or ports managed by the network address and/or port translation service.

The address and/or port translation information request may be received from an application function or a network exposure function.

The identifier of the apparatus may be a uniform resource identifier of the address and/or port translation information service.

The apparatus may comprise circuitry configured to: retrieve from a local translation table the address and/or port used by a core network to communicate with the terminal corresponding to the address and/or port used by the application to communicate with the terminal; and provide an address and/or port translation information response comprising the address and/or port used by the core network to communicate with the terminal.

The registration request may be sent to a network function repository function.

The apparatus may host the network address and/or port translation service.

The apparatus may be a user plane function or a stand-alone function separate from the user plane function.

According to an aspect there is provided a method comprising: sending a registration request comprising a range of addresses and/or ports managed by a network address and/or port translation service and an identifier of the network address and/or port translation service; and receiving an address and/or port translation information request comprising an address and/or port used by an application to communicate with a terminal, wherein the address and/or port used by the application to communicate with a terminal is within the range of addresses and/or ports managed by the network address and/or port translation service.

The address and/or port translation information request may be received from an application function or a network exposure function.

The identifier of the apparatus may be a uniform resource identifier of the address and/or port translation information service.

The method may comprise: retrieving from a local translation table the address and/or port used by a core network to communicate with the terminal corresponding to the address and/or port used by the application to communicate with the terminal; and provide an address and/or port translation information response comprising the address and/or port used by the core network to communicate with the terminal.

The registration request may be sent to a network function repository function.

The method may be performed by an apparatus hosting the network address and/or port translation service.

The method may be performed by a user plane function or a stand-alone function separate from the user plane function.

According to an aspect there is provided a computer program comprising computer executable code which when run on at least one processor is configured to: send a registration request comprising a range of addresses and/or ports managed by a network address and/or port translation service and an identifier of the network address and/or port translation service; and receive an address and/or port translation information request comprising an address and/or port used by an application to communicate with a terminal, wherein the address and/or port used by the application to communicate with a terminal is within the range of addresses and/or ports managed by the network address and/or port translation service.

The address and/or port translation information request may be received from an application function or a network exposure function.

The identifier of the apparatus may be a uniform resource identifier of the address and/or port translation information service.

The computer program may comprise computer executable code which when run on at least one processor is configured: retrieve from a local translation table the address and/or port used by a core network to communicate with the terminal corresponding to the address and/or port used by the application to communicate with the terminal; and provide an address and/or port translation information response comprising the address and/or port used by the core network to communicate with the terminal.

The registration request may be sent to a network function repository function.

The at least one processor may be part of an apparatus hosting the network address and/or port translation service.

The at least one processor may be part of a user plane function or a stand-alone function separate from the user plane function.

According to an aspect there is provided an apparatus comprising at least one processor and at least one memory including computer code for one or more programs, the at least one memory and the computer code configured, with the at least one processor, to cause the apparatus at least to: send a discovery request comprising an address and/or port used by an application to communicate with a terminal; receive a discovery response comprising an identifier of a network address and/or port translation service, wherein the address and/or port used by the application to communicate with a terminal is within a range of addresses and/or port managed by the network address and/or port translation service; and send an address and/or port translation information request comprising the address and/or port used by the application to communicate with the terminal to the network address and/or port translation service.

The identifier of the network address and/or port translation service may be a uniform resource identifier of the network address and/or port translation service.

The discovery response may comprise the range of addresses and/or port managed by the network address and/or port translation service.

The at least one memory and the computer program code may be configured to, with the at least one processor, cause the apparatus at least to: store, for a period of time indicated in the discovery response, an association between the range of addresses and/or port managed by the network address and/or port translation service and the identifier of the network address and/or port translation service; and use the association to locally determine the identifier of the network address and/or port translation serve to serve subsequent address and/or port translation information requests.

The discovery request may be sent to a network function repository function; and the discovery response may be received from the network function repository function.

The at least one memory and the computer program code may be configured to, with the at least one processor, cause the apparatus at least to: receive an address and/or port translation information response comprising an address and/ or port used by a core network to communicate with the terminal from the network address and/or port translation service.

The at least one memory and the computer program code may be configured to, with the at least one processor, cause the apparatus at least to: use the address and/or port used by the core network to communicate with the terminal to obtain a subscriber identifier of the terminal.

Using the address and/or port used by the core network to communicate with the terminal to obtain a subscriber identifier of the terminal may comprise: sending a subscriber identifier request comprising the address and/or port used by the core network to communicate with the terminal; and receiving a subscriber identifier response comprising the subscriber identifier of the terminal.

The apparatus may be an application function.

The apparatus may be a network exposure function.

The at least one memory and the computer program code may be configured to, with the at least one processor, cause the apparatus at least to: receive a request from an application function comprising the address and/or port used by the application to communicate with the terminal; detect that the address and/or port used by the application to communicate with the terminal is not within a range of addresses and/or port managed by the core network; and send an address and/or port translation information request to the network address and/or port translation service.

According to an aspect there is provided an apparatus comprising means for: sending a discovery request comprising an address and/or port used by an application to communicate with a terminal; receiving a discovery response comprising an identifier of a network address and/or port translation service, wherein the address and/or port used by the application to communicate with a terminal is within a range of addresses and/or port managed by the network address and/or port translation service; and sending an address and/or port translation information request comprising the address and/or port used by the application to communicate with the terminal to the network address and/or port translation service.

The identifier of the network address and/or port translation service may be a uniform resource identifier of the network address and/or port translation service.

The discovery response may comprise the range of addresses and/or port managed by the network address and/or port translation service.

The apparatus may comprise means for: storing, for a period of time indicated in the discovery response, an association between the range of addresses and/or port managed by the network address and/or port translation service and the identifier of the network address and/or port translation service; and using the association to locally determine the identifier of the network address and/or port translation serve to serve subsequent address and/or port translation information requests.

The discovery request may be sent to a network function repository function; and the discovery response may be received from the network function repository function.

The apparatus may comprise means for: receiving an address and/or port translation information response comprising an address and/or port used by a core network to communicate with the terminal from the network address and/or port translation service.

The apparatus may comprise means for: using the address and/or port used by the core network to communicate with the terminal to obtain a subscriber identifier of the terminal.

Using the address and/or port used by the core network to communicate with the terminal to obtain a subscriber identifier of the terminal may comprise: sending a subscriber identifier request comprising the address and/or port used by the core network to communicate with the terminal; and receiving a subscriber identifier response comprising the subscriber identifier of the terminal.

The apparatus may be an application function.

The apparatus may be a network exposure function.

The apparatus may comprise means for: receiving a request from an application function comprising the address and/or port used by the application to communicate with the terminal; detecting that the address and/or port used by the application to communicate with the terminal is not within a range of addresses and/or port managed by the core network; and sending an address and/or port translation information request to the network address and/or port translation service.

According to an aspect there is provided an apparatus comprising circuitry configured to: send a discovery request comprising an address and/or port used by an application to communicate with a terminal; receive a discovery response comprising an identifier of a network address and/or port translation service, wherein the address and/or port used by the application to communicate with a terminal is within a range of addresses and/or port managed by the network address and/or port translation service; and send an address and/or port translation information request comprising the address and/or port used by the application to communicate with the terminal to the network address and/or port translation service.

The identifier of the network address and/or port translation service may be a uniform resource identifier of the network address and/or port translation service.

The discovery response may comprise the range of addresses and/or port managed by the network address and/or port translation service.

The apparatus may comprise circuitry configured to: store, for a period of time indicated in the discovery response, an association between the range of addresses and/or port managed by the network address and/or port translation service and the identifier of the network address and/or port translation service; and use the association to locally determine the identifier of the network address and/or port translation serve to serve subsequent address and/or port translation information requests.

The discovery request may be sent to a network function repository function; and the discovery response may be received from the network function repository function.

The apparatus may comprise circuitry configured to: receive an address and/or port translation information response comprising an address and/or port used by a core network to communicate with the terminal from the network address and/or port translation service.

The apparatus may comprise circuitry configured to: use the address and/or port used by the core network to communicate with the terminal to obtain a subscriber identifier of the terminal. Using the address and/or port used by the core network to communicate with the terminal to obtain a subscriber identifier of the terminal may comprise: sending a subscriber identifier request comprising the address and/or port used by the core network to communicate with the terminal; and receiving a subscriber identifier response comprising the subscriber identifier of the terminal.

The apparatus may be an application function.

The apparatus may be a network exposure function.

The apparatus may comprise circuitry configured to: receive a request from an application function comprising the address and/or port used by the application to communicate with the terminal; detect that the address and/or port used by the application to communicate with the terminal is not within a range of addresses and/or port managed by the core network; and send an address and/or port translation information request to the network address and/or port translation service.

According to an aspect there is provided a method comprising: sending a discovery request comprising an address and/or port used by an application to communicate with a terminal; receiving a discovery response comprising an identifier of a network address and/or port translation service, wherein the address and/or port used by the application to communicate with a terminal is within a range of addresses and/or port managed by the network address and/or port translation service; and sending an address and/or port translation information request comprising the address and/or port used by the application to communicate with the terminal to the network address and/or port translation service.

The identifier of the network address and/or port translation service may be a uniform resource identifier of the network address and/or port translation service.

The discovery response may comprise the range of addresses and/or port managed by the network address and/or port translation service.

The method may comprise: storing, for a period of time indicated in the discovery response, an association between the range of addresses and/or port managed by the network address and/or port translation service and the identifier of the network address and/or port translation service; and using the association to locally determine the identifier of the network address and/or port translation serve to serve subsequent address and/or port translation information requests.

The discovery request may be sent to a network function repository function; and the discovery response may be received from the network function repository function.

The method may comprise: receiving an address and/or port translation information response comprising an address and/or port used by a core network to communicate with the terminal from the network address and/or port translation service.

The method may comprise: using the address and/or port used by the core network to communicate with the terminal to obtain a subscriber identifier of the terminal.

Using the address and/or port used by the core network to communicate with the terminal to obtain a subscriber identifier of the terminal may comprise: sending a subscriber identifier request comprising the address and/or port used by the core network to communicate with the terminal; and
    receiving a subscriber identifier response comprising the subscriber identifier of the terminal.

The method may be performed by an application function.

The method may be performed by a network exposure function.

The method may comprise: receiving a request from an application function comprising the address and/or port used by the application to communicate with the terminal; detecting that the address and/or port used by the application to communicate with the terminal is not within a range of addresses and/or port managed by the core network; and sending an address and/or port translation information request to the network address and/or port translation service.

According to an aspect there is provided a computer program comprising computer executable code which when run on at least one processor is configured to: send a discovery request comprising an address and/or port used by an application to communicate with a terminal; receive a discovery response comprising an identifier of a network address and/or port translation service, wherein the address and/or port used by the application to communicate with a terminal is within a range of addresses and/or port managed by the network address and/or port translation service; and send an address and/or port translation information request comprising the address and/or port used by the application to communicate with the terminal to the network address and/or port translation service.

The identifier of the network address and/or port translation service may be a uniform resource identifier of the network address and/or port translation service.

The discovery response may comprise the range of addresses and/or port managed by the network address and/or port translation service.

The computer program may comprise computer executable code which when run on at least one processor is configured to: store, for a period of time indicated in the discovery response, an association between the range of addresses and/or port managed by the network address and/or port translation service and the identifier of the network address and/or port translation service; and use the association to locally determine the identifier of the network address and/or port translation serve to serve subsequent address and/or port translation information requests.

The discovery request may be sent to a network function repository function; and the discovery response may be received from the network function repository function.

The computer program may comprise computer executable code which when run on at least one processor is configured to: receive an address and/or port translation information response comprising an address and/or port used by a core network to communicate with the terminal from the network address and/or port translation service.

The computer program may comprise computer executable code which when run on at least one processor is configured to: use the address and/or port used by the core network to communicate with the terminal to obtain a subscriber identifier of the terminal.

Using the address and/or port used by the core network to communicate with the terminal to obtain a subscriber identifier of the terminal may comprise: sending a subscriber identifier request comprising the address and/or port used by the core network to communicate with the terminal; and
    receiving a subscriber identifier response comprising the subscriber identifier of the terminal.

The at least one processor may be part of an application function.

The at least one processor may be part of a network exposure function.

The computer program may comprise computer executable code which when run on at least one processor is configured to: receive a request from an application function comprising the address and/or port used by the application to communicate with the terminal; detect that the address and/or port used by the application to communicate with the terminal is not within a range of addresses and/or port managed by the core network; and send an address and/or port translation information request to the network address and/or port translation service.

According to an aspect there is provided an apparatus comprising at least one processor and at least one memory including computer code for one or more programs, the at least one memory and the computer code configured, with the at least one processor, to cause the apparatus at least to: receive a registration request comprising a range of addresses and/or ports managed by a network address and/or port translation service and an identifier of the network address and/or port translation service from an apparatus hosting the network address and/or port translation service; and perform a registration of the apparatus hosting the network address and/or port translation service.

The at least one memory and the computer program code may be configured to, with the at least one processor, cause the apparatus at least to: send a registration response comprising an indication that the registration of the apparatus hosting the network address and/or port translation service has been performed.

The at least one memory and the computer program code may be configured to, with the at least one processor, cause the apparatus at least to: receive a discovery request comprising the address and/or port used by an application to communicate with a terminal; and send a discovery response comprising the identifier of the network address and/or port translation service The discovery request may be received from an application function or a network exposure function; and the discovery response may be sent to the application function or the network exposure function.

The identifier of the network address and/or port translation service may be a uniform resource identifier of the network address and/or port translation service.

According to an aspect there is provided an apparatus comprising means for: receiving a registration request comprising a range of addresses and/or ports managed by a network address and/or port translation service and an identifier of the network address and/or port translation service from an apparatus hosting the network address and/or port translation service; and performing a registration of the apparatus hosting the network address and/or port translation service.

The apparatus may comprise means for: sending a registration response comprising an indication that the registration of the apparatus hosting the network address and/or port translation service has been performed.

The apparatus may comprise means for: receiving a discovery request comprising the address and/or port used by an application to communicate with a terminal; and sending a discovery response comprising the identifier of the network address and/or port translation service The discovery request may be received from an application function or a network exposure function; and the discovery response may be sent to the application function or the network exposure function.

The identifier of the network address and/or port translation service may be a uniform resource identifier of the network address and/or port translation service.

According to an aspect there is provided an apparatus comprising circuitry configured to: receive a registration request comprising a range of addresses and/or ports managed by a network address and/or port translation service and an identifier of the network address and/or port translation service from an apparatus hosting the network address and/or port translation service; and perform a registration of the apparatus hosting the network address and/or port translation service.

The apparatus may comprise circuitry configured to: send a registration response comprising an indication that the registration of the apparatus hosting the network address and/or port translation service has been performed.

The apparatus may comprise circuitry configured to: receive a discovery request comprising the address and/or port used by an application to communicate with a terminal; and send a discovery response comprising the identifier of the network address and/or port translation service The discovery request may be received from an application function or a network exposure function; and the discovery response may be sent to the application function or the network exposure function.

The identifier of the network address and/or port translation service may be a uniform resource identifier of the network address and/or port translation service.

According to an aspect there is provided a method comprising: receiving a registration request comprising a range of addresses and/or ports managed by a network address and/or port translation service and an identifier of the network address and/or port translation service from an apparatus hosting the network address and/or port translation service; and performing a registration of the apparatus hosting the network address and/or port translation service.

The method may comprise: sending a registration response comprising an indication that the registration of the apparatus hosting the network address and/or port translation service has been performed.

The method may comprise: receiving a discovery request comprising the address and/or port used by an application to communicate with a terminal; and sending a discovery response comprising the identifier of the network address and/or port translation service The discovery request may be received from an application function or a network exposure function; and the discovery response may be sent to the application function or the network exposure function.

The identifier of the network address and/or port translation service may be a uniform resource identifier of the network address and/or port translation service.

According to an aspect there is provided a computer program comprising computer executable code which when run on at least one processor is configured to: receive a registration request comprising a range of addresses and/or ports managed by a network address and/or port translation service and an identifier of the network address and/or port translation service from an apparatus hosting the network address and/or port translation service; and perform a registration of the apparatus hosting the network address and/or port translation service.

The computer program may comprise computer executable code which when run on at least one processor is configured to: send a registration response comprising an indication that the registration of the apparatus hosting the network address and/or port translation service has been performed.

The computer program may comprise computer executable code which when run on at least one processor is configured to: receive a discovery request comprising the address and/or port used by an application to communicate with a terminal; and send a discovery response comprising the identifier of the network address and/or port translation service The discovery request may be received from an application function or a network exposure function; and the discovery response may be sent to the application function or the network exposure function.

The identifier of the network address and/or port translation service may be a uniform resource identifier of the network address and/or port translation service.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF: Application Function
AMF: Access Management Function
API: Application Programming Interface
AUSF: Authentication Server Function
BS: Base Station
BSF: Binding Support Function
CU: Centralized Unit
DL: Downlink
DN: Data Network
DNN: Data network Name
DU: Distributed Unit
EAS: Edge Application Server
eNB: eNodeB
gNB: gNodeB
GPSI: Generic Public subscriber identifier
GSM: Global System for Mobile communication
HSS: Home Subscriber Server
IMS: IP multimedia subsystem
IoT: Internet of Things
IP: Internet Protocol
LTE: Long Term Evolution
MAC: Medium Access Control
MEC: Multi-access Edge Computing
MS: Mobile Station
MTC: Machine Type Communication
N3IWF: Non 3GPP interworking function
NAPT: Network Address and/or Port Translation
NAPTF: Network Address and/or Port Translation Function
NAPTS: Network Address and/or Port Translation Service
NAT: Network Address Translation
NATF: Network Address Translation Function
NATS: Network Address Translation Service
NEF: Network Exposure Function
NF: Network Function
NMI: NAPT Mapping Information
NR: New radio
NRF: Network function Repository Function
PCC: Policy and Charging Control
PCF: Policy Control Function
PDU: Packet Data Unit
PSA: PDU session anchor
RAM: Random Access Memory
(R)AN: (Radio) Access Network
ROM: Read Only Memory
SIP: Session Initiation Protocol
SMF: Session Management Function
STUN: Session Traversal Utilities for NAPT
SUPI: SUbscriber Permanent Identifier
TCP: Transmission Control Protocol
TR: Technical Report
TS: Technical Specification
UDM: User Data Management
UDP: User Datagram Protocol
UE: User Equipment
UL: Uplink
UP: User Plane
URI: Uniform Resource Identifier
UMTS: Universal Mobile Telecommunication System
URLLC: Ultra-Reliable Low Latency Communication
USB: Universal Serial Bus
WAGF: Wireline Access Gateway Function
3GPP: $3^{rd}$ Generation Partnership Project
5G: $5^{th}$ Generation
5GC: 5G Core network
5GS: 5G System

REFERENCES

RFC 4787: Network Address Translation (NAT) Behavioral Requirements for Unicast UDP.
RFC 6887: Port Control Protocol.
3GPP TR 23.748: Study on enhancement of support for Edge Computing in 5G Core network (5GC).
3GPP TS 23.228: Annex G. Reference Architecture and procedures when the NAT is invoked between the UE and the IMS domain.
3GPP TS 23.501: System Architecture for the 5G System (5GS). § 5.6.7 for NEF Influence API
3GPP TS 23.502: Procedures for the 5G System (5GS).
3GPP TS 29.521: 5G System. Binding Support Management Service.
3GPP TS 29.522: 5G System. Network Exposure Function Northbound APIs. Stage 3.

BRIEF DESCRIPTION OF THE FIGURES

Embodiments will now be described, by way of example only, with reference to the accompanying Figures in which.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
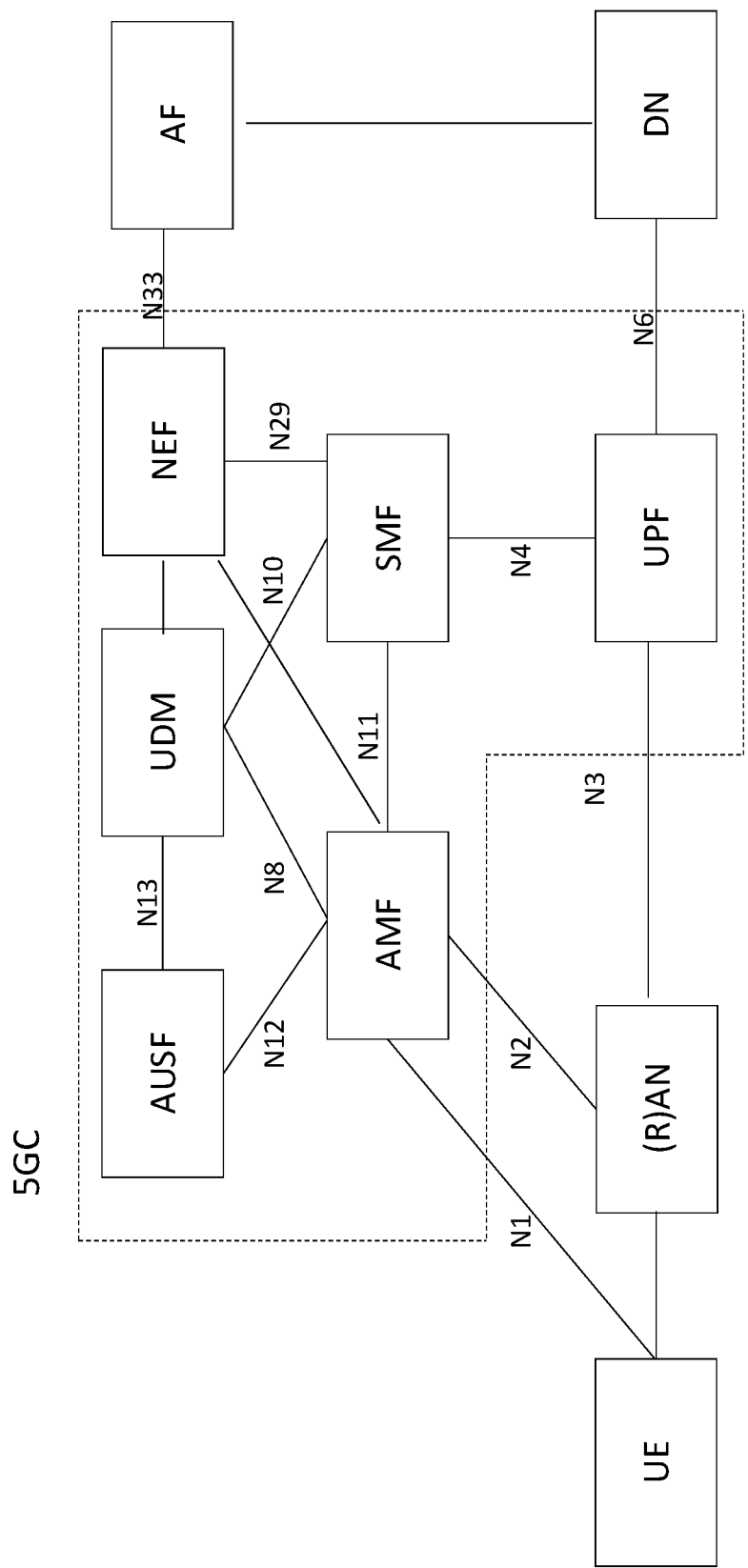
FIG. 1 shows a schematic representation of a 5G system.

FIG. 1 shows a schematic representation of a 5G system (5GS). The 5GS may comprises a terminal, a (radio) access network ((R)AN), a 5G core network (5GC), one or more application functions (AF) and one or more data networks (DN).

The 5G (R)AN may support 3GPP based radio in which case it comprises one or more gNodeB (gNB) which may be deployed as distributed unit functions connected to one or more gNodeB (gNB) centralized unit functions. The 5G (R)AN may support other kind of access technology like wireline access in which case it comprises one or more wireline access gateway functions (W-AGF), untrusted access to 5GC in which case it comprises one or more non 3GPP interworking function (N3IWF) or other. The mechanisms described in this disclosure may apply regardless of the nature of the 5G (R)AN.

The 5GC may comprise an access management function (AMF), a session management function (SMF), an authentication server function (AUSF), a user data management (UDM), a user plane function (UPF) and/or a network exposure function (NEF). Although not illustrated the 5GC may comprise other network functions (NF), such as a network address and/or port translation function (NAPTF), a network function repository function (NRF) or a binding support function (BSF).

Figure 2:
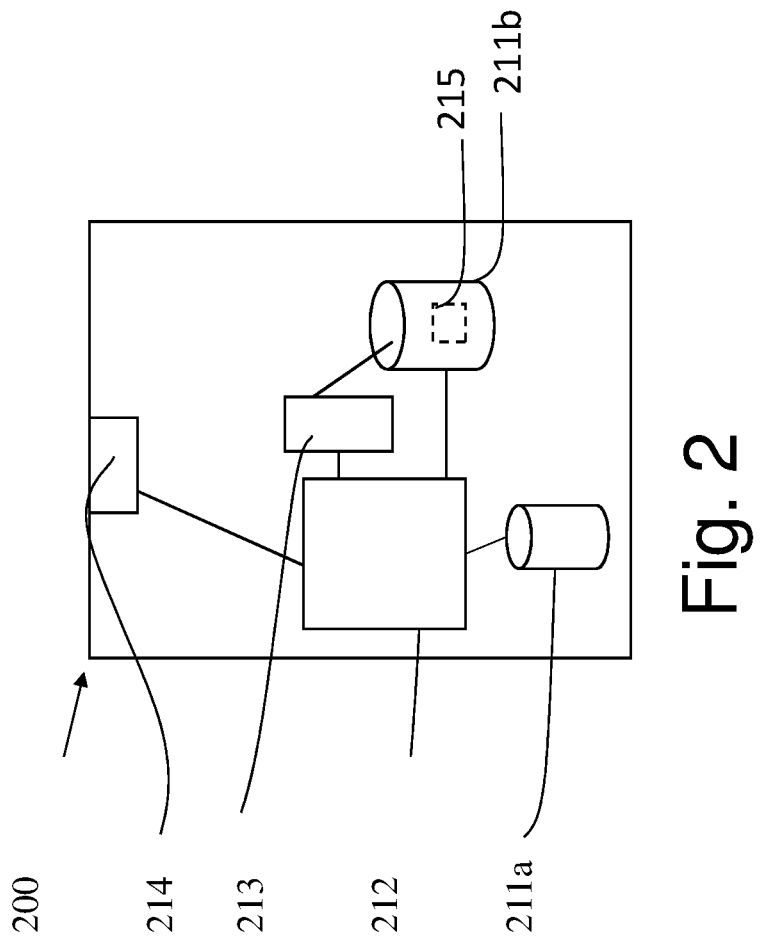
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
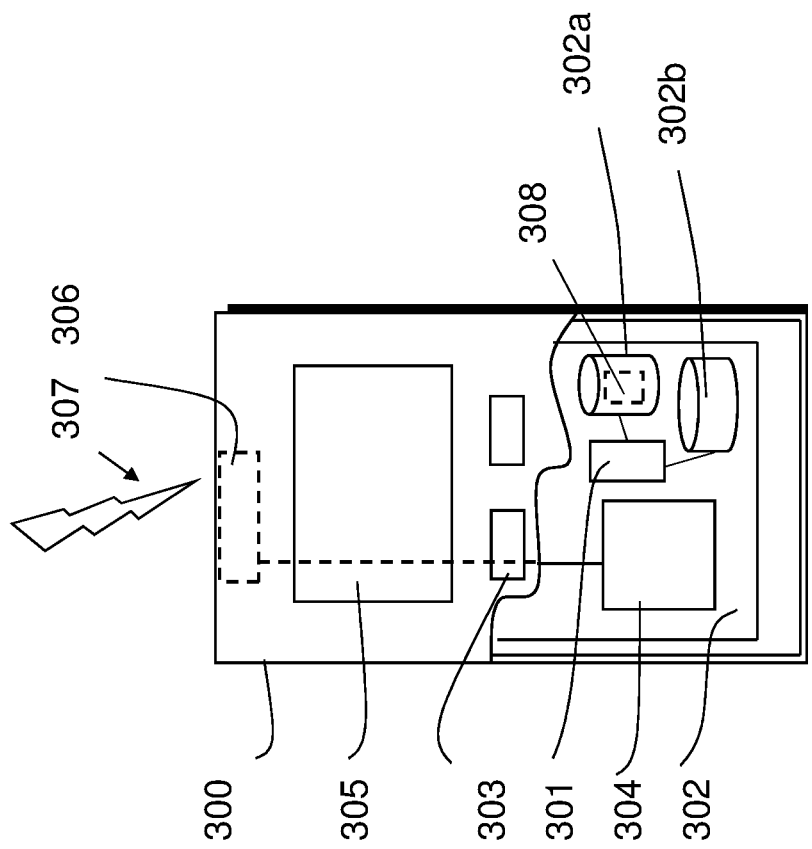
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302a and the ROM 211b. The at least one processor 301 may be configured to execute an appropriate software code 308. The software code 308 may for example allow to perform one or more of the present aspects. The software code 308 may be stored in the ROM 302b.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

3GPP Release 17 comprises a study item on how to improve 3GPP support of edge computing. Key Issues to be studied and related candidate solutions are documented in 3GPP TR 23.748.

In a 5GS a UE may access an application hosted by a platform located at the edge of the 5GC. For instance, the UE may use a single packet data unit (PDU) session via the UPF.

Figure 4:
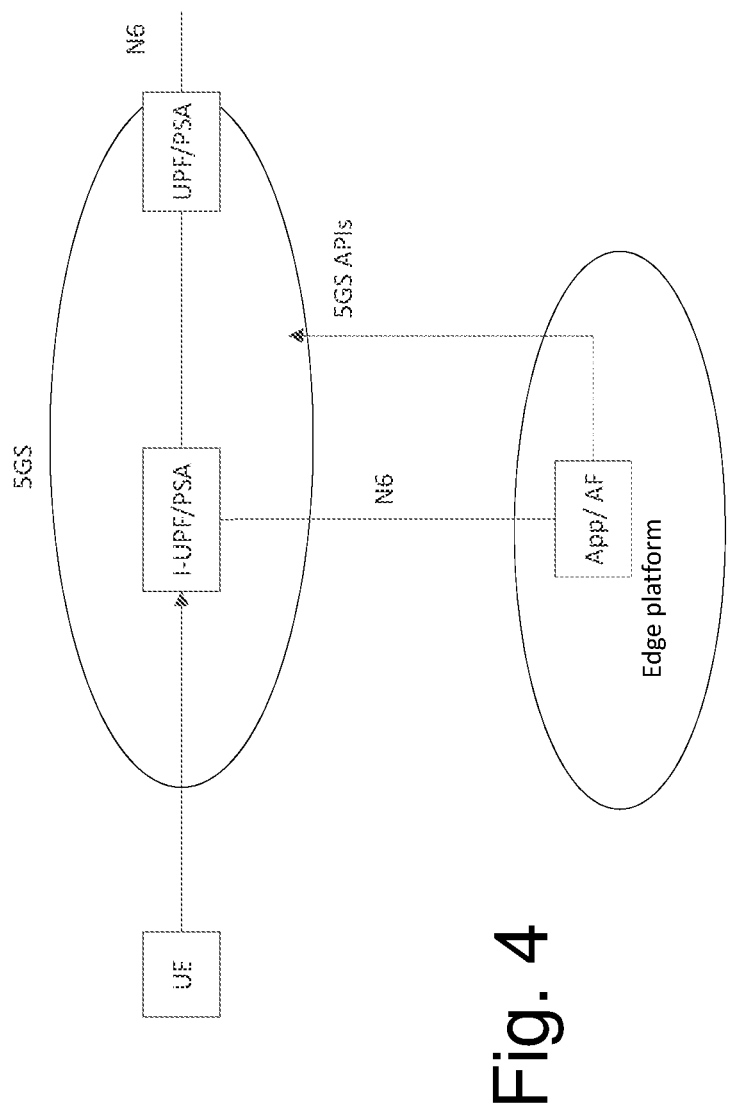
FIG. 4 shows a schematic representation of a terminal access to an application hosted by an edge platform.

FIG. 4 shows a schematic representation of a UE access to an application hosted by an edge platform. The platform may be a multi-access computing (MEC) platform or a third party platform (public cloud) that provides services to the application on the UE. The platform may be associated with an AF that has authorized access to consume application programming interfaces (API) of the 5GC.

The AF may be an authorized AF or un-authorized AF (TS 23.501 clause 6.2.10).

An un-authorized AF may access 5GS services only via NEF APIs (TS 23.501 clause 6.2.5).

Current NEF influence API (Nnef_TrafficInfluence) defined in 3GPP Release 15 provides an authorized AF with a mapping between a UE (source) internet protocol (IP) address allocated/used by the 5GC and a UE subscriber identifier allocated by the 5GC, such as a subscriber permanent identifier (SUPI).

The UE IP address allocated/used by the 5GC may also be called 5GC UE IP address, private UE IP address or internal UE IP address.

The UE subscriber identifier allocated by the 5GC may also be called 5GC UE ID.

The 5GC UE IP address may be network address translated (NATed) by a network function (NF) when traffic from this UE is exchanged over N6. This NATing may transform the 5GC UE IP address into a UE IP address used by an application (when exchanging traffic with this UE).

The UE IP address used by the application may also be called application UE IP address, public UE IP address or external UE IP address.

The network function (NF) enforcing the NAT service (NAPTS) may be a UPF (PDU session anchor) or a stand-alone NF called NAT function (NAPTF) regardless of whether it takes into consideration port information (TCP or UDP) to provide addressing translation services.

It will be understood that multiple 5GC UE IP addresses may be mapped to the same application UE IP address but with different ports, for example different transmission control protocol (TCP) ports or different user data protocol (UDP) ports.

Accordingly, the 5GC may allocate a 5GC UE IP address to a UE. The 5GC UE IP address and a port determined by the UE when exchanging traffic with an application may be network address and/or port translated (NAPTed) by a NF when traffic is exchanged over N6. This NAPTing may transform the 5GC UE IP address and port into a UE IP address and port used by an application when exchanging traffic with this UE.

The UE IP address and/or port used by the application may also be called application UE IP address and/or port, public UE IP address and/or port or external UE IP address and/or port.

The NF enforcing the NAPTS may be the UPF (PDU session anchor) or a stand-alone NF called NAPT function (NAPTF).

It will be understood that in this disclosure the NAPTS hosted by the NAPTF may perform network address translation only or network address and port translation.

The NAPTF may operate between the platform hosting the application and the UPF. The UPF may relay user plane IP traffic between the UE and the application on the platform.

Examples of NAPTS implementations are described in (RFC 4787).

In order to address a subscriber via 5GS APIs the AF may need a subscriber identifier, such as a generic public subscriber identifier (GPSI), subscriber permanent identifier (SUPI) or international mobile subscriber identifier (IMSI). 5GC UE IP address may serve as identity (TS 29.522 clause 4.4.7.2).

BSF may be invoked to obtain the subscriber identifier of a UE, such as the GPSI, SUPI or IMSI, based on a 5GC UE IP address (TS 29.521 clause 4.2.4).

The AF, at the edge of the 5GC, may not be able to invoke NF/NEF APIs for a subscriber with an application UE IP address (IP y in FIG. 5) when the NAPTF operates between the UPF and the AF. The 5GC may only be aware of the 5GC UE IP address it has allocated (IP x in FIG. 5). The 5GC may not be aware of the application UE IP address and/or port.

Figure 5:
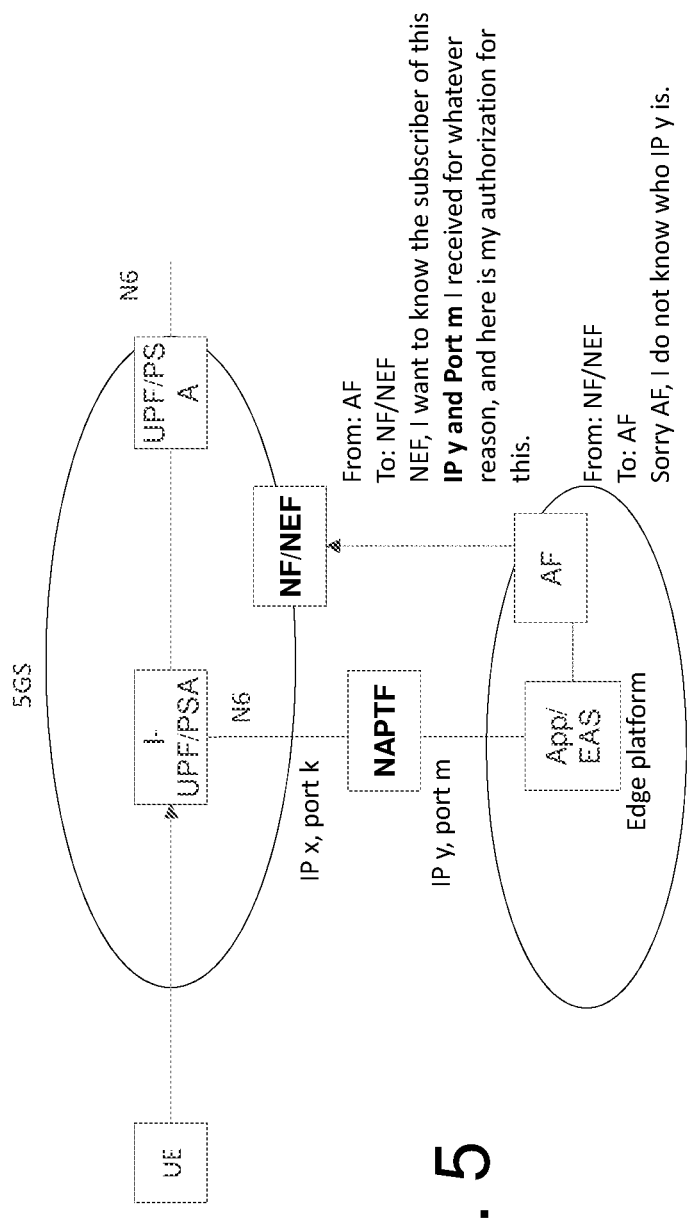
FIG. 5 shows a schematic representation of a terminal access to an application hosted by an edge platform when a network address and/or port translation function operates between a user plane function and the edge platform.

FIG. 5 shows a schematic representation of a UE access to an application hosted by an edge platform when the NAPTF operates between the UPF and the edge platform.

On PDU session establishment, the SMF may notify the PCF with the allocated 5GC UE IP address, for example if request type is "initial request", dynamic policy and charging control (PCC) is deployed and PDU session type is IPv4 or IPv6 or IPv4v6 and if a policy control request trigger condition is met (TS 23.502 clause 4.3.2.2 UE Requested PDU Session Establishment, 4.3.2.2.1 Step 9).

The PCF may invoke Nbsf_Management_Register service operation to create binding information in the BSF. (TS 23.502 clause 4.16.4 SM Policy Association Establishment, clause 4.16.5.1 SMF initiated SM Policy Association Modification).

Via Nbsf_Management_Register a NF service consumer (e.g. PCF) may register the session binding information for a UE in the BSF by providing the subscriber identifier of the UE, such as the GPSI, SUPI or IMSI, the data network name (DNN), the 5GC UE IP address (IP x in FIG. 5), the selected PCF address and/or the uniform resource identifier (URI) for a certain PDU Session to the BSF. The BSF may store the information. (TS 29.521 clause 4.2.2 Nbsf_Management_Register Service Operation).

Via Nbsf_Management_discovery service the GPSI, SUPI or IMSI may be retrieved based on the 5GC UE IP address.

In 3GPP, traversal and detection of a NAPTS between UE and an IP multimedia subsystem (IMS) domain is defined in (TS 23.228 Annex G). The mechanisms are based on information available from application layer signalling, such as session initiation protocol (SIP), and deployment of specific functionality such as session traversal utilities for NAPT (STUN).

In 3GPP there is no application layer agnostic mechanism to discover address and/or port translation on the user plane path.

Port control protocol (RFC 6887) and its predecessor NAT-PMP (RFC 6886) may define user plane path mechanism but may require the protocol functionality in the host or client and the NAPTF. Port control protocol (RFC 6887) and its predecessor NAT-PMP (RFC 6886) may require the host or client to be able to determine the address where they can fetch address mapping information from the NAPTF. They may involve the user terminal (UE) while the current disclosure defines a solution that avoids involving the user terminal (UE) to deal with NAPTS/NATS enforced in the network.

Examples of NAPTS type variations and NAPTS software are described in (RFC 4787).

Software appliances providing NAPTS may be deployed in a cloud. Such appliance may exhibit specific APIs that allow service operations for translation behaviour of those appliances.

In one or more aspect of this disclosure an AF may receive a request about a UE from an application where the application can only identify the UE based on the application UE IP address and/or port (IP y, port m in FIG. 5). The AF may be a MEC control AF. The application may be on an edge access server (EAS) (e.g. as defined in 3GPP TR 23.748).

In one or more aspect of the disclosure a NAPTS (regardless of whether it is hosted by a NAPTF or a UPF) may be configured with a range of application UE IP addresses and/or ports managed by the NAPTS. The NAPTF or UPF hosting the NAPTS may register this range with the NRF.

The NAPTF may use new parameters of the Nnrf_NFManagement_NFRegister API (TS 23.502 § 5.2.7.2.2).

In one or more aspect of the disclosure a NF, such as an AF or a NEF, may discover the NAPTS by providing an application UE IP address and possibly port (IP y, port m in FIG. 5).

In one or more aspect of the disclosure when a NF, such as an AF or a NEF, invokes a 5GC API containing the application UE IP address, the AF may also provide the port in the request.

In one or more aspect of the disclosure when the AF (assumed to be an authorized AF) receives an EAS request targeting an application UE IP address and/or port (IP y, port m in FIG. 5) the AF may issue a Nnrf_NFDiscovery_Request (TS 23.502 § 5.2.7.3.2) with the application UE IP address and/or port as input. The AF may receive an identifier, such as a service URI, of a NAPTS responsible of this application UE IP address and/or port.

The AF may then use the service URI of the NAPTS to obtain the reverse translation of the application UE IP address and/or port (IP y, port m in FIG. 5). That is, the AF may obtain the 5GC UE IP address and/or port (IP x, port k in FIG. 5) from the NAPTS.

Based on the 5GC UE IP address and/or port, the AF may obtain a subscriber identifier of the UE, such as the GPSI, SUPI or IMSI. The AF may then use the subscriber identifier of the UE to issue a 5GC request about the UE.

In one or more aspect of the disclosure when the AF (assumed to be an unauthorized AF) receives an EAS request targeting an application UE IP address and/or port (IP y, port m in FIG. 5), the NEF may serve the EAS request on behalf of the AF.

The NEF may issue a Nnrf_NFDiscovery_Request (TS 23.502 § 5.2.7.3.2) with the application UE IP address and/or port as input. The NEF may receive an identifier, such as a service URI, of the NAPTS responsible of this application UE IP address and/or port.

Figure 6:
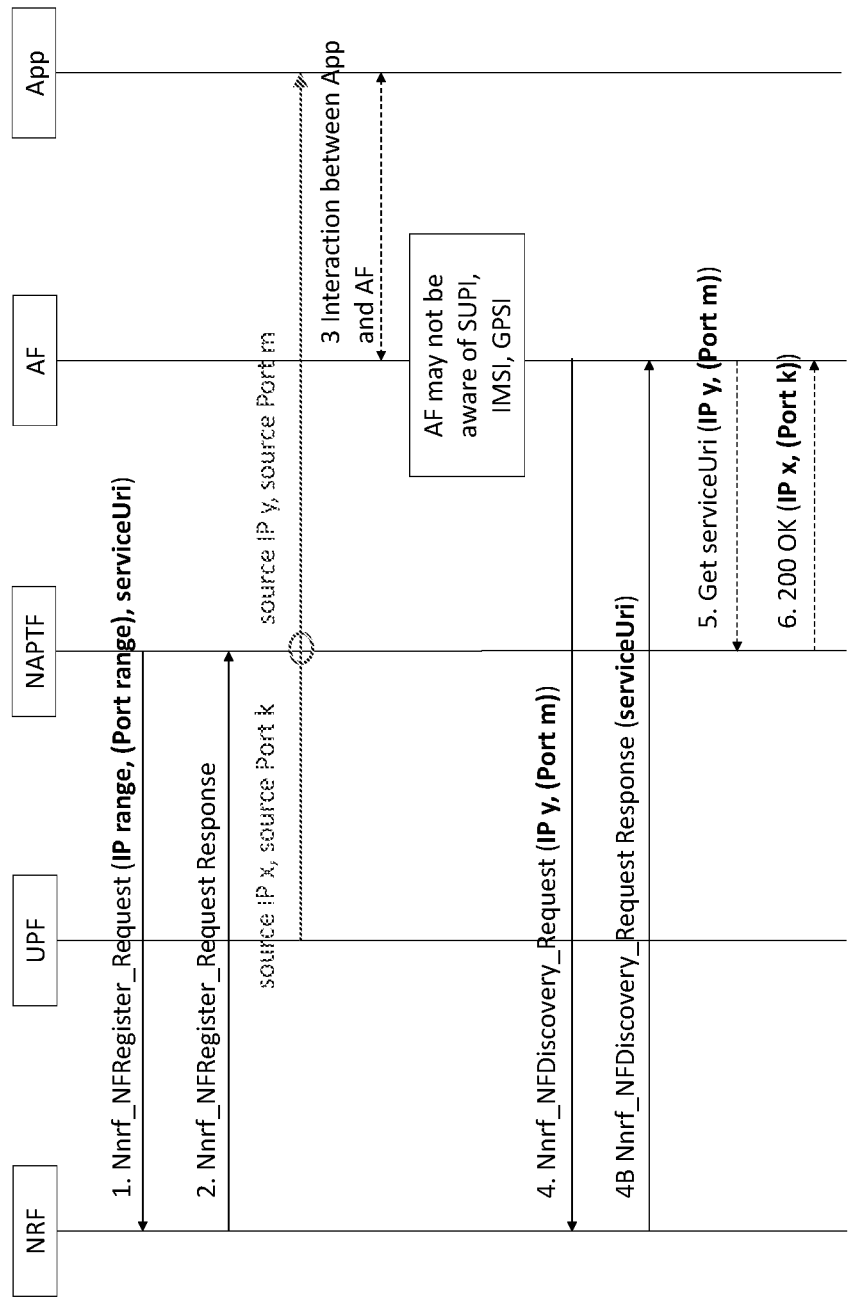
FIG. 6 shows a schematic representation of a signalling diagram of a process for providing an address and/or port used by a core network to communicate with a terminal to an application function in a cellular system.

FIG. 6 shows a schematic representation of a signalling diagram of a process for providing a 5GC address and/or port to an AF in a 5GS. Both the NAPTF and the AF may be trusted NFs. The NAPTF or UPF may host the NAPTS.

In step 1, the NAPTS may perform registration. The NAPTS may use the procedure specified in TS 23.502 clause 4.17.1. The NAPTS may send a Nnrf_NFRegister_Request to an NRF. For NFProfile (as defined in TS 29.510) a new NFType NAPTF may be defined. The NFProfile for NFType NAPTF may include at least a range of application UE IP addresses and/or ports managed/used by the NAPTS. The NFProfile for NAPTF may also include a service URI via which of the NAPTS may be invoked.

In the an alternative where the UPF may host the NAPTS, the NFProfile for NFType UPF may be upgraded to include at least a range of application UE IP addresses and/or ports managed/used by the NAPTS, and a service URI via which the NAPTS may be invoked.

In step 2, the NRF may acknowledge and accept NAPTS registration via a Nnrf_NFManagement_NFRegister response (TS 23.502 clause 4.17.1).

In step 3, an application hosted on the edge platform may receive IP traffic from a UE. The application may interact (e.g. to fetch information about the UE) with platform services that may act as an AF. The AF may be aware of the presence of the NAPTS in the user plane path, for instance based on local configuration.

In order to consume subscription specific 5GS services the AF may need to discover a 5GC UE IP address and/or port and/or a subscriber identifier of the UE, such as the GPSI, SUPI or IMSI. The subscriber identifier of the UE may be retrieved from a BSF using the 5GC UE IP address and/or port via Nbsf_Management_discovery service.

In step 4a, the AF as a trusted NF service consumer may invoke Nnrf_NFDiscovery_Request (Expected NF service Name, NF Type of the expected NF instance, NF type of the NF consumer).

The AF may invoke Nnrf_NFDiscovery_Request from the NRF as specified in TS 23.502 clause 4.17.4. The AF may use new values for Expected NF service Name and NF Type defined for NAPTF or UPF. Parameters may include an NAPTed application UE IP address and/or port.

In step 4B the NRF may send one or more matching NFProfiles to the AF as NF service consumer via Nnrf_NFDiscovery_Request Response message. Each NFProfile may include a service URI for a NAPTS. Each NFProfile may contain at least a range of application UE IP address and/or port managed/used by the NAPTS. The consumer of the Nnrf_NFDiscovery_Request (here AF) may cache each NFProfile for a period of time. The period of time may be provided in the Nnrf_NFDiscovery_Request Response message The AF may cache the received one or more NFProfiles for later use. This may remove the need to further contact the NRF for another application UE IP address and/or port within the range indicated in the NFProfile as long as a period of time (e.g. caching timer) has not elapsed. URI and URI structure is specified in TS 29.501 clause 4.4.

In steps 5 and 6, the AF may use a service URI of a NAPTS obtained in step 4B and invoke the NAPTS API to obtain the 5GC UE IP address and/or port from the NAPTS.

Figure 7:
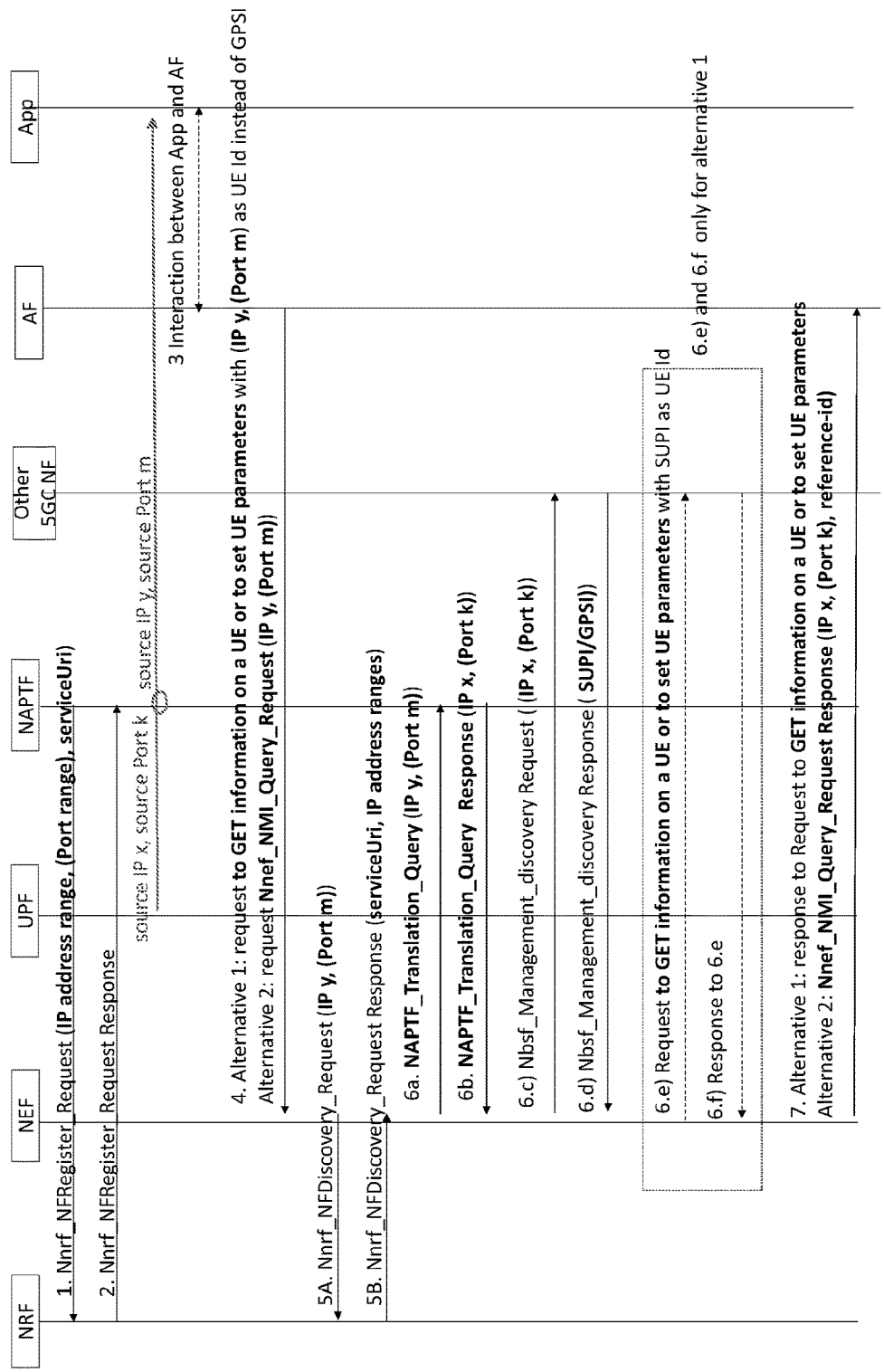
FIG. 7 shows a schematic representation of a signalling diagram of a process for providing an address and/or port used by a core network to communicate with a terminal to an application function via a network exposure function in a cellular system.

The AF may then obtain subscriber identifier of the UE, such as the GPSI, SUPI or IMSI, from a BSF based on the 5GC UE IP address and/or port FIG. 7 shows a schematic representation of a signalling diagram of a process for providing 5GC address and/or port to an AF via a NEF in a 5GS. The NAPTF may be a trusted NE The AF may be an untrusted NE A NAPTF or a UPF may host the NAPTS.

A NEF service operation invoked by the AF may allow authorized untrusted AF to request, via NEF, services requiring a reverse translation from an application UE IP address and/or port to a 5GC UE IP address and/or port.

The NEF service operation may be a new service operation Nnef_NAPTMappingInformation (Nnef_NMI) dedicated to getting address mapping information related with NAPTS enforced by the 5GC (alternative 2 of step 4), or may be a "global" request (alternative 1 of step 4) where the application request is to GET or SET information related with an UE just identified by the address and/or port used by the application to communicate with the terminal.

In step 1, the NAPTS may perform registration. The NAPTS may use the procedure specified in TS 23.502 clause 4.17.1. The NAPTS may send a Nnrf_NFRegister_Request to an NRF. For NFProfile (as defined in TS 29.510) a new NFType NAPTF may be defined to support stand-alone NAPTS. The NFProfile for NFType NAPTF may include at least a range of application UE IP addresses and/or ports managed/used by the NAPTS. The NFProfile for NAPTF may also include a service URI via which the NAPTS may be invoked.

In an alternative where the UPF may host the NAPTS, the NFProfile for NFType UPF may be upgraded to include at least a range of application UE IP addresses and/or ports managed/used by the NAPTF, and a service URI via which the NAPTS may be invoked In step 2, the NRF may acknowledge and accept NAPTS registration via a Nnrf_NFManagement_NFRegister response (TS 23.502 clause 4.17.1).

In step 3, an application hosted on the edge platform may receive IP traffic from a UE. The application may interact (e.g. to fetch information about the UE) with platform services that may act as an AF.

In step 4, the AF may issue a request for a service from the 5GC. There may be two alternatives.

In alternative 1, the AF may issue a "global" request on behalf of the application, where the "global" request is to get 5GC information about a UE or to set (i.e. configure) 5GC information about this UE. Regardless of whether the request is to get 5GC information about a UE or set 5GC information about the UE, the AF may identify the UE based on the address and/or port used by the application to communicate with the terminal/UE.

In this alternative 1, the AF may issue an existing NEF request like Nnef_ParameterProvision_Update or Nnef_ServiceParameter but where the AF identifies the UE based on the address and/or port used by the application to communicate with the terminal/UE.

In alternative 2, the AF may issue a request to get the 5GC UE IP address and/or port and/or a subscriber identifier of the UE, such as the GPSI, SUPI or IMSI. In this alternative, the AF may issue a Nnef_NMI_Query_Request. The AF may be aware of the presence of a NAPTS in the user plane path, for instance based on local configuration. In order to consume subscription specific 5GS services the AF may need to discover a 5GC UE IP address and/or port and/or a subscriber identifier of the UE, such as the GPSI, SUPI or IMSI. The subscriber identifier of the UE may be retrieved from a BSF using the 5GC UE IP address and/or port via a Nbsf_Management_discovery service.

In step 5A, the NEF may invoke a Nnrf_NFDiscovery_Request to a NRF (Expected NF service Name, NF Type of the expected NF instance, NF type of the NF consumer). The NEF may invoke Nnrf_NFDiscovery_Request from the NRF as specified in TS 23.502 clause 4.17.4. The NEF may use new values for Expected NF service Name and NF Type defined for NAPTF or for UPF. Parameters may include an NAPTed application UE IP address and/or port.

In step 5B the NRF may send one or more matching NFProfiles to the NEF as NF service consumer via Nnrf_NFDiscovery_Request Response message. Each NFProfile may include a service URI for a NAPTS. Each NFProfile may contain at least a range of application UE IP address and/or port managed/used by the NAPTF. The consumer of the Nnrf_NFDiscovery_Request (here AF) may cache each NFProfile for a period of time. The period of time may be provided in the Nnrf_NFDiscovery_Request Response message The NEF may cache the received one or more NFProfiles for later use. This may remove the need to further contact the NRF for another application UE IP address and/or port within one of the ranges indicated in the NFProfiles as long as the caching timer has not elapsed. URI and URI structure is specified in TS 29.501 clause 4.4.

In steps 6A and 6B, the NEF may use a service URI of a NAPTS obtained in step 5B or retrieved locally based on the caching of a previous NRF response and invoke the NAPTS API to obtain the 5GC UE IP address and/or port from the NAPTS.

In step 6A, the NEF may send a NAPT_Translation_Query_Request comprising the application UE IP address and/or port received from the AF to a NAPTS using the service URI received in step 5B.

In step 6B, the NAPTF may send a NAT_Translation_Query Response to the NEF comprising the 5GC UE IP address and/or port.

It may be noted that NAPTS mappings may have lifetime and mappings may change over time.

In steps 6C and 6D The NEF may obtain subscriber identifier of the UE, such as the GPSI, SUPI or IMSI, from a BSF based on the 5GC UE IP address and/or port.

For alternative 1, step 6D may be followed by steps 6E, 6F and 7.

In step 6E/6F, the NEF may proceed with the GET or SET parameter request about the UE identified by the subscriber identifier of the UE.

In step 7, the NEF may send a response to the global request received in step 4, for example Nnef_ParameterProvision_Update Response or Nnef_ServiceParameter Response.

For alternative 2, step 6D may be followed by step 7.

In step 7, the NEF may send a Nnef_NMI_Query_Request Response to the AF. The response may include the subscriber identifier of the UE, such as the GPSI, SUPI or IMSI. The response may comprise the 5GC UE IP address and/or port. The AF may use the result of this transaction (subscriber identifier of the UE) to address the UE later on.

The AF may not know whether a received UE IP address and/or port have been NAPTed or not (whether a received UE IP address and/or port are a 5GC UE IP address and/or port or an application UE IP address and/or port). Therefore, the AF may not be able to subsequently indicate in an API whether a UE IP address and/or port have been NAPTed or not.

The AF may issue a NEF request such as TrafficInfluence API or PCF API (Npcf_PolicyAuthorization Service as defined in 23.502 § 5.2.5.3) with a NAPTed UE application UE IP address and/or port.

The NEF may then query the BSF with the NAPTed application UE IP address and optionally port and may get an error (e.g. 404 Not Found).

The NEF may then invoke NRF Discovery with the NAPTed application UE IP address and/or port and the NRF may respond with the service URI of NAPTS (as in step 5A/5B of FIG. 7).

The NEF may use the service URI of the NAPTS and send a request to the NAPTS to resolve the NAPTed application UE IP address and/or port (as in step 6A/6B of FIG. 7).

The NAPTS may respond to the NEF with a 5GC UE IP address and/or port.

The NEF may then query the BSF with the 5GC UE IP address and/or port

Figure 8:
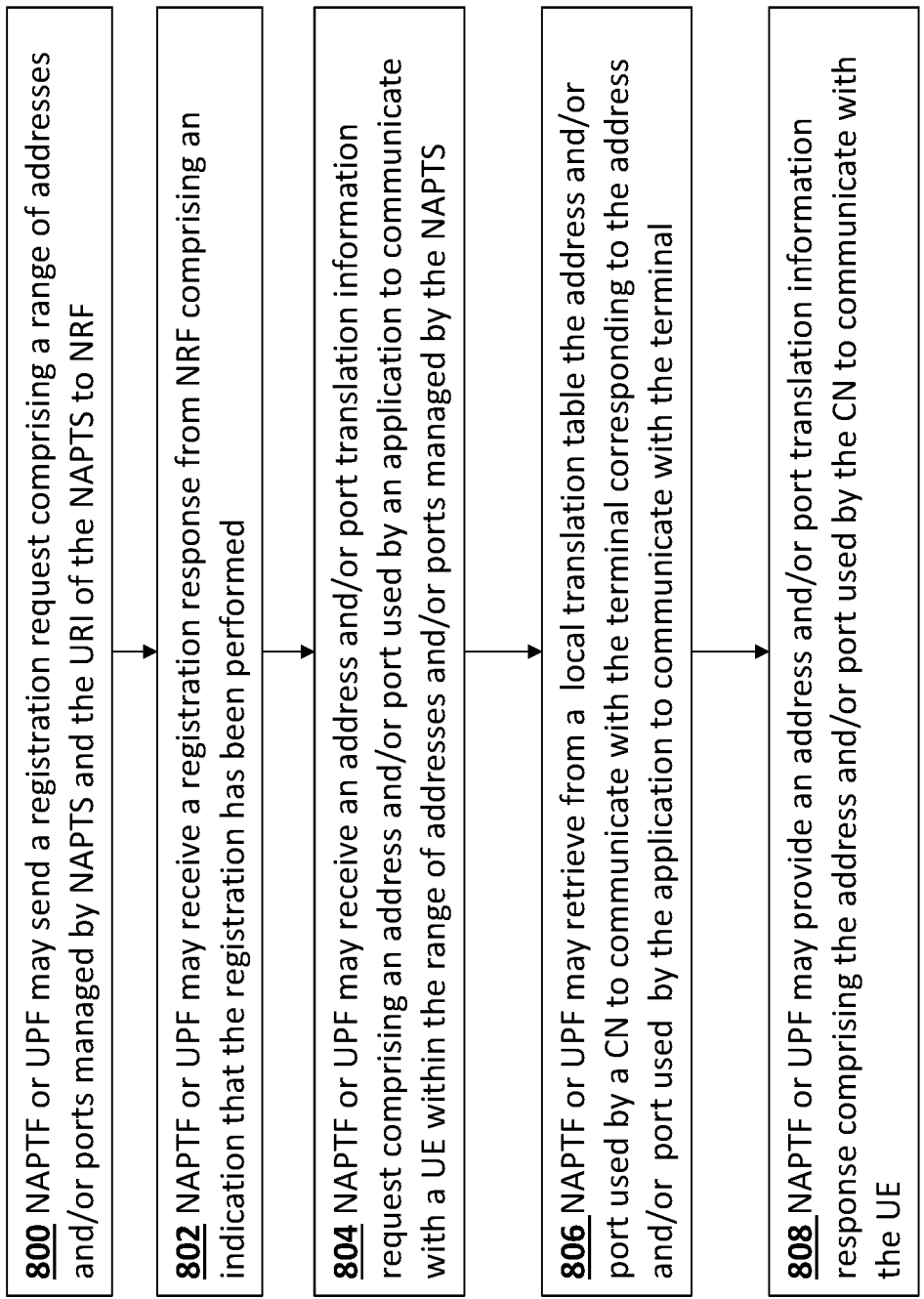
FIG. 8 shows a schematic representation of a block diagram of a method performed by a network function hosting a network address and/or port translation service, such as a network address and/or port translation function or a user plane function, for providing an address and/or port used by a core network to communicate with a terminal to an application function in a cellular system.

FIG. 8 shows a schematic representation of a block diagram of a method performed by a NF hosting a NAPTS, such as a NAPTF or UPF, for providing an address and/or port used by a CN to communicate with a terminal in a cellular system.

In step 800, the NAPTF or UPF may send a registration request comprising a range of addresses and/or ports managed by the NAPTS and the URI of the NAPTS to a NRF.

In step 802, the NAPTF or UPF may receive a registration response from the NRF comprising an indication that the registration has been performed.

In step 804, the NAPTF or UPF may receive an address and/or port translation information request comprising an address and/or port used by an application to communicate with a UE within the range of addresses and/or ports managed by the NAPTS. The NAPTF or UPF may receive the address and/or port translation information request from an AF or a NEF.

In step 806, the NAPTF or UPF may retrieve from a local translation table the address and/or port used by a CN to communicate with the terminal corresponding to the address and/or port used by the application to communicate with the terminal.

In step 808, the NAPTF or UPF may provide an address and/or port translation information response comprising the address and/or port used by the CN to communicate with the UE. The NAPTF or UPF may provide the address and/or port translation information response to the AF or the NEF.

Figure 9:
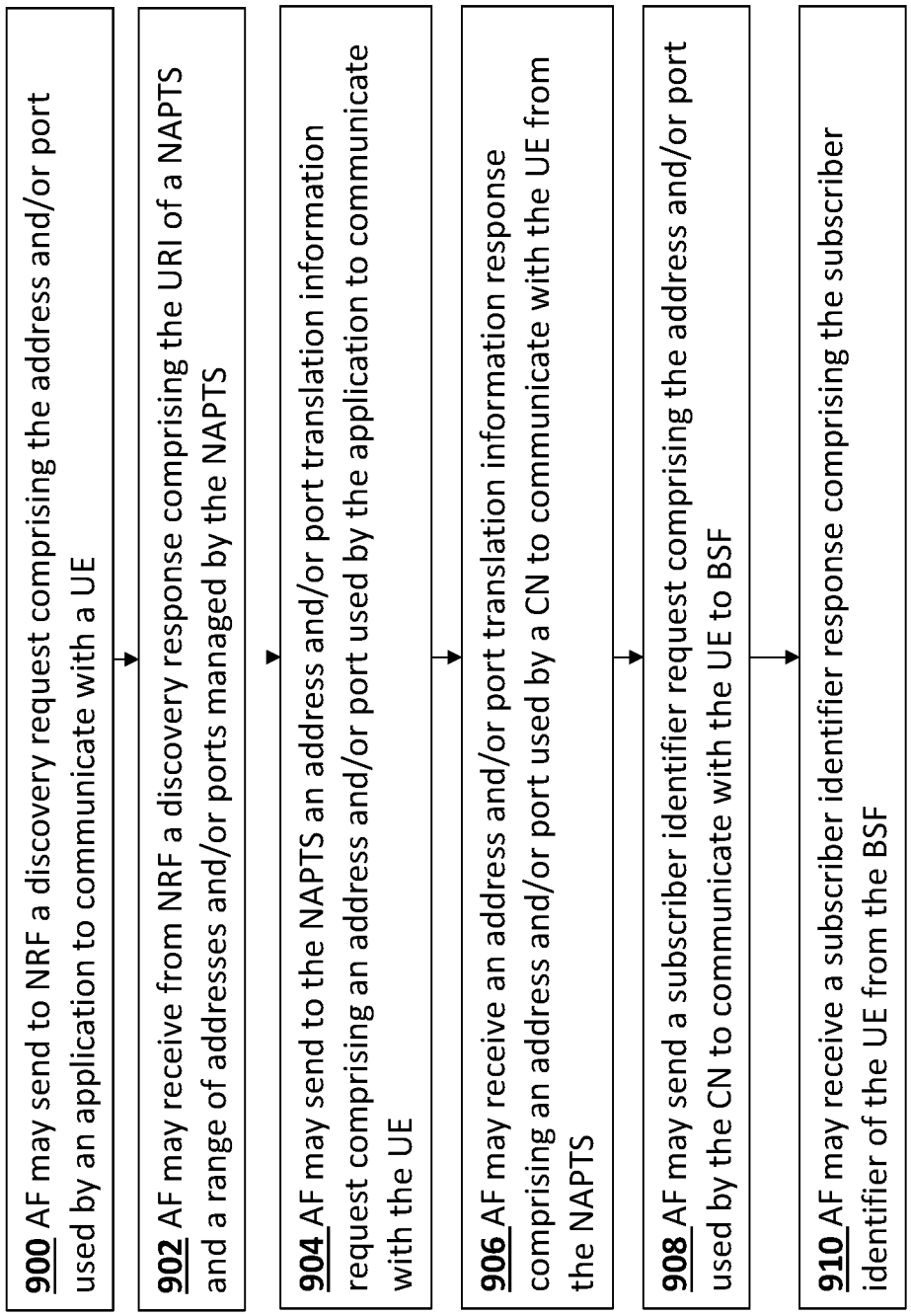
FIG. 9 shows a schematic representation of a block diagram of a method performed by an application function for providing an address and/or port used by a core network to communicate with a terminal to an application function in a cellular system.

FIG. 9 shows a schematic representation of a block diagram of a method performed by an AF for providing an address and/or port used by a CN to communicate with a terminal in a cellular system.

In step 900, the AF may send to a NRF a discovery request comprising the address and/or port used by an application to communicate with a UE.

In step 902, the AF may receive from NRF a discovery response comprising the URI of a NAPTS and a range of addresses and/or ports managed by the NAPTS. The address and/or port used by the application to communicate with the UE is within the range of addresses and/or port managed by the NAPTS.

In step 904, the AF may send to the NAPTS an address and/or port translation information request comprising an address and/or port used by the application to communicate with the UE.

In step 906, the AF may receive an address and/or port translation information response comprising an address and/or port used by a CN to communicate with the UE from the NAPTS.

In step 908, the AF may send a subscriber identifier request comprising the address and/or port used by the CN to communicate with the UE to a BSF.

In step 910, the AF may receive a subscriber identifier response comprising the subscriber identifier of the UE from the BSF. The subscriber identifier of the UE may comprise a SUPI, a GPSI or IMSI.

Figure 10:
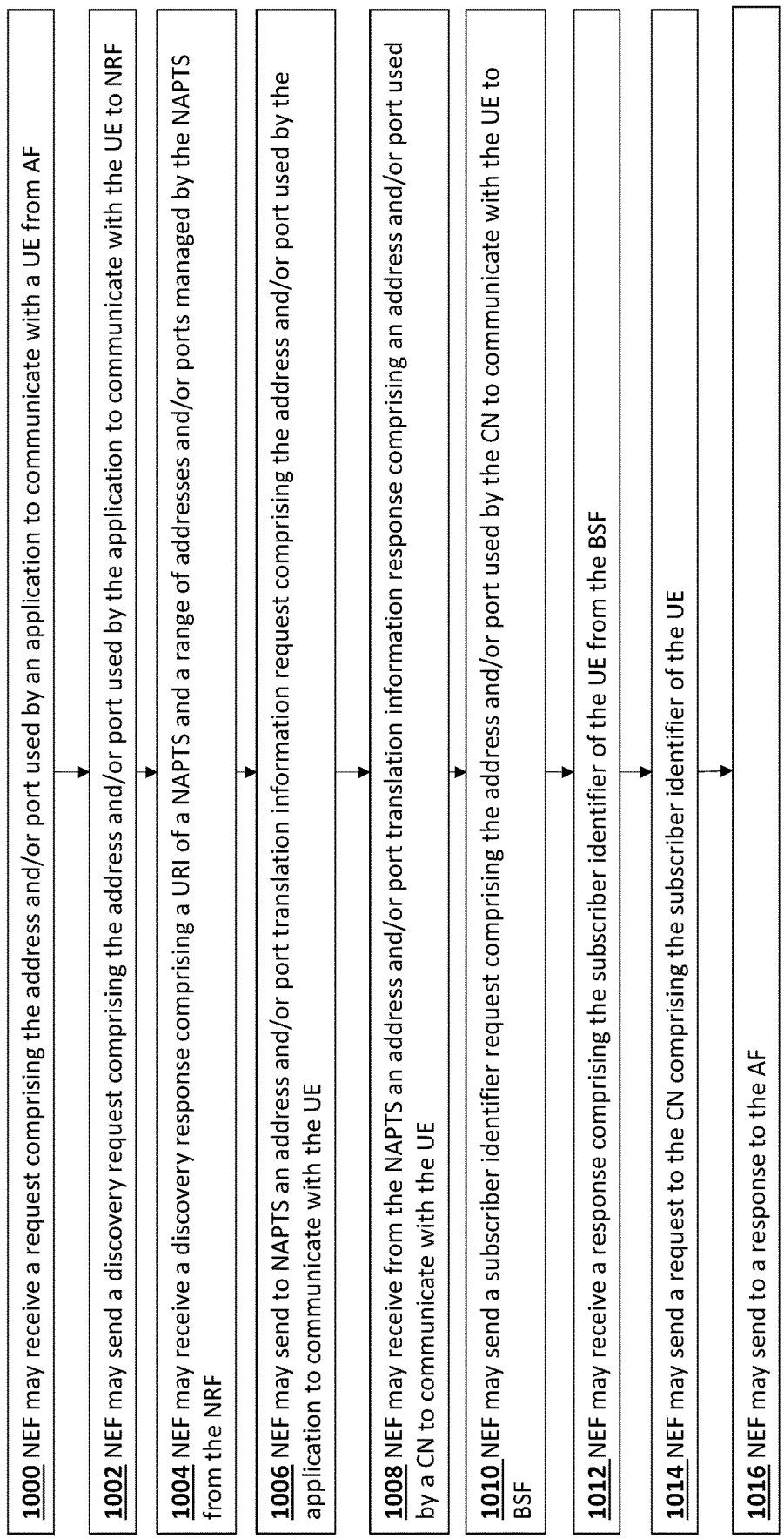
FIG. 10 shows a schematic representation of a block diagram of a method performed by a network exposure function for providing an address and/or port used by a core network to communicate with a terminal to an application function in a cellular system.

The AF may store, for a period of time indicated in the discovery response, an association between the range of addresses and/or port managed by the NAPTS and the URI of the NAPTS. The AF may use the association to locally determine the URI of the NAPTS to serve subsequent address and/or port translation information requests FIG. 10 shows a schematic representation of a block diagram of a method performed by a NEF for providing an address and/or port used by a CN to communicate with a terminal in a cellular system.

In step 1000, the NEF may receive a request comprising the address and/or port used by an application to communicate with a UE from the AF. The request is for example a get information or set information request about the UE.

In step 1002, the NEF may send a discovery request comprising the address and/or port used by the application to communicate with the UE to a NRF.

In step 1004, the NEF may receive a discovery response comprising a URI of a NAPTS and a range of addresses and/or ports managed by the NAPTS from the NRF.

In step 1006, the NEF may detect that the address and/or port used by the application to communicate with the UE is not within a range of addresses and/or port managed by the CN. The NEF may detect that the address and/or port used by the application to communicate with the UE is within the range of addresses and/or ports managed by the NAPTS. The NEF may send to the NAPTS an address and/or port translation information request comprising the address and/or port used by the application to communicate with the UE.

In step 1008, the NEF may receive from the NAPTS an address and/or port translation information response comprising an address and/or port used by a CN to communicate with the UE.

In step 1010, the NEF may send a subscriber identifier request comprising the address and/or port used by the CN to communicate with the UE to a BSF.

In step 1012, the NEF may receive a subscriber identifier response comprising the subscriber identifier of the UE from the BSF. The subscriber identifier of the UE may comprise a SUPI, a GPSI or IMSI.

In step 1014, the NEF may send a request (similar request as in step 1000 but with the subscriber identifier of the UE instead of the address and/or port used by the application to communicate with the UE) comprising the subscriber identifier of the UE to a CN entity. The request is for example a get information or set information request about the UE.

In step 1016, the NEF may, upon receiving an answer from the CN entity from the request in step 1014, send a response to the AF. The response may be a get information or set information response about the UE.

Figure 11:
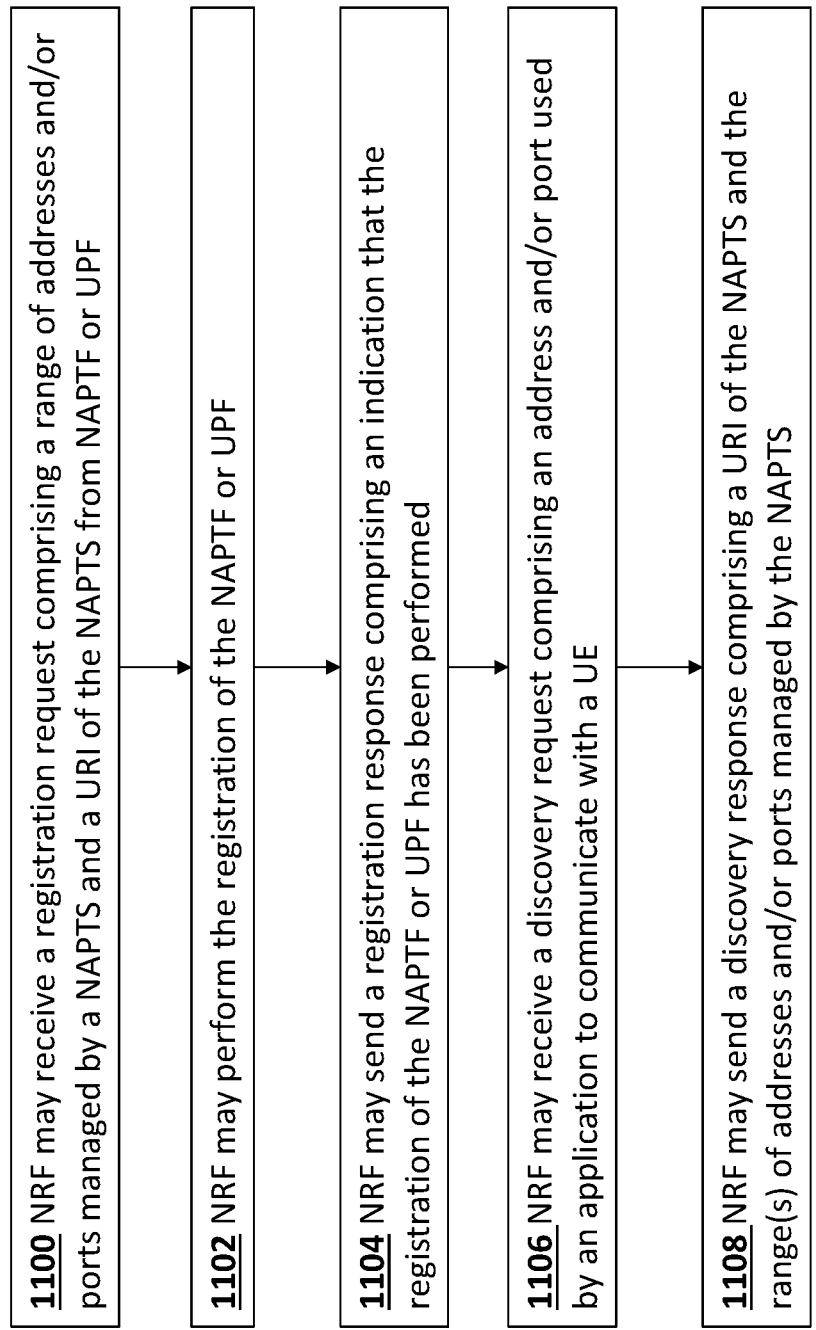
FIG. 11 shows a schematic representation of a block diagram of a method performed by network function repository function for registering a network address and/or port translation function in a cellular system.

FIG. 11 shows a schematic representation of a block diagram of a method performed by NRF for registering a NAPTF in a cellular system.

In step 1100, the NRF may receive a registration request comprising a range of addresses and/or ports managed by a NAPTS and a URI of the NAPTS from a NAPTF or a UPF.

In step 1102, the NRF may perform the registration of the NAPTF or UPF.

In step 1104, the NRF may send a registration response to the NAPTF or UPF comprising an indication that the registration of the NAPTF or UPF has been performed.

In step 1106, the NRF may receive a discovery request comprising an address and/or port used by an application to communicate with a UE. The NRF may receive the discovery request from an AF or a NEF.

In step 1108, the NRF may send a discovery response comprising a URI of the NAPTS and the range(s) of addresses and/or ports managed by the NAPTS. The NRF may send the discovery response to the AF or the NEF.

Figure 12:
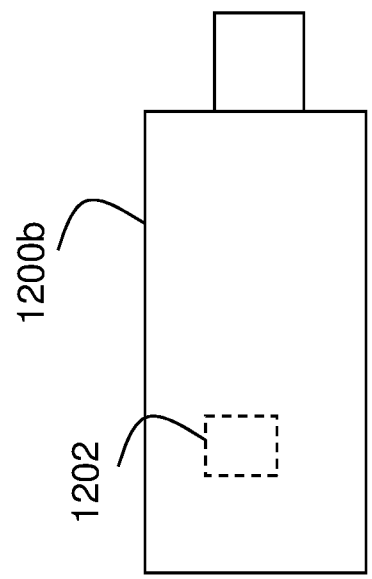
FIG. 12 shows a schematic representation of a non-volatile memory medium storing instructions which when executed by a processor allow a processor to perform one or more of the steps of the method of FIGS. 8 to 11.
Figure 12:
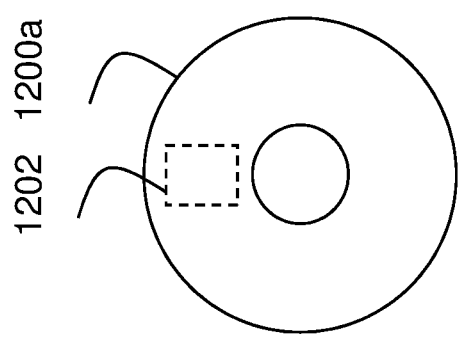

FIG. 12 shows a schematic representation of non-volatile memory media 1200a (e.g. computer disc (CD) or digital versatile disc (DVD)) and 1200b (e.g. universal serial bus (USB) memory stick) storing instructions and/or parameters 1202 which when executed by a processor allow the processor to perform one or more of the steps of the methods of FIGS. 8 to 11.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 8 to 10, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
 (i) a combination of analogue and/or digital hardware circuit(s) with software/firmware and
 (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:
 at least one processor; and
 at least one memory including computer program code of a network address and port translation service;
 the at least one memory and the computer program code configured to, with the at least one processor, cause the network address and port translation service at least to:
  receive an address and port translation information request comprising a user equipment (UE) internet protocol (IP) address and port used by an application to communicate with a terminal, wherein the UE IP address and port used by the application to communicate with a terminal is within a range of UE IP addresses and ports managed by the network address and port translation service; and
  retrieve from a local translation table a 5G core network (5GC) and user equipment (UE) IP and port used by a core network to communicate with the terminal corresponding to the UE IP address and port used by the application to communicate with the terminal; and
  provide an address and port translation information response comprising the 5GC UE IP address and port used by the core network to communicate with the terminal.

2. The apparatus of claim 1, wherein the address and port translation information request is received from an application function or a network exposure function.

3. The apparatus of claim 1, wherein an identifier of the network address and port translation service is a uniform resource identifier of the address and port translation information service.

4. The apparatus of claim 1, wherein the apparatus comprises a user plane function or a stand-alone function separate from the user plane function.

5. The apparatus of claim 1, wherein the at least one memory and the computer program code configured to, with the at least one processor, cause the network address and port translation service at least to:
 send to a network function repository function a registration request to register the network address and port translation service with the network repository function, the registration request comprising the range of addresses and ports managed by a network address and port translation service and an identifier of the network address and port translation service; and receiving from the network repository function, a registration response comprising an indication that registration of the apparatus has been performed.

6. An apparatus comprising: at least one processor; and at least one memory including computer program code; the at least one memory and the computer program code configured to, with the at least one processor, cause the apparatus at least to:
receive a registration request comprising a range of UE IP addresses and ports managed by a network address and port translation service and an identifier of the network address and port translation service from an apparatus hosting the network address and port translation service; and
perform a registration of the network address and port translation service; and
send a registration response to the apparatus hosting the network address and port translation service, the registration response comprising an indication that the registration of the apparatus hosting the network address and port translation service has been performed.

7. The apparatus of claim 6, wherein the at least one memory and the computer program code are configured to, with the at least one processor, cause the apparatus at least to:
receive a discovery request comprising the UE IP address and port used by an application to communicate with a terminal; and
send a discovery response comprising the identifier of the network address and port translation service.

8. The apparatus of claim 7, wherein the discovery request is received from an application function or a network exposure function; and wherein the discovery response is sent to the application function or the network exposure function.

9. The apparatus of claim 8, wherein the identifier of the network address and port translation service is a uniform resource identifier of the network address and port translation service.

10. An apparatus comprising:
at least one processor; and
at least one memory including computer program code;
the at least one memory and the computer program code configured to, with the at least one processor, cause the apparatus at least to:
send a discovery request comprising a user equipment (UE) internet protocol (IP) address and port used by an application to communicate with a terminal;
receive a discovery response comprising an identifier of a network address and port translation service, which manages a range of UE IP addresses and ports that includes the UE IP address and port used by the application to communicate with a terminal; and
send an address and port translation information request comprising the UE IP address and port used by the application to communicate with the terminal to the network address and port translation service.

11. The apparatus of claim 10, wherein the identifier of the network address and port translation service is a uniform resource identifier of the network address and port translation service.

12. The apparatus of claim 10, wherein the discovery request is sent to a network function repository function; and wherein the discovery response is received from the network function repository function.

13. The apparatus of claim 10, wherein the at least one memory and the computer program code are further configured to, with the at least one processor, cause the apparatus at least to:
receive an address and port translation information response comprising an 5G core network (5GC) user equipment (UE) and internet protocol (IP) address and port used by a core network to communicate with the terminal from the network address and port translation service.

14. The apparatus of claim 13, wherein the at least one memory and the computer program code are further configured to, with the at least one processor, cause the apparatus at least to:
use the 5GC UE IP address and port used by the core network to communicate with the terminal to obtain a subscriber identifier of the terminal.

15. The apparatus of claim 14, wherein using the 5GC UE IP address and port used by the core network to communicate with the terminal to obtain a subscriber identifier of the terminal comprises:
sending a subscriber identifier request comprising the 5GC UE IP address and port used by the core network to communicate with the terminal; and
receiving a subscriber identifier response comprising the subscriber identifier of the terminal.

16. The apparatus of claim 10, wherein the apparatus comprises an application function.

17. The apparatus of claim 10, wherein the apparatus comprises a network exposure function.

18. The apparatus of claim 17, wherein the at least one memory and the computer program code are further configured to, with the at least one processor, cause the apparatus at least to:
receive a request from an application function comprising the UE IP address and port used by the application to communicate with the terminal;
detect that the UE IP address and port used by the application to communicate with the terminal is not within a range of UE IP addresses and port managed by the core network; and
send an address and port translation information request to the network address and port translation service.

19. The apparatus of claim 10, wherein the discovery response comprises the range of UE IP addresses and port managed by the network address and port translation service.

20. The apparatus of claim 19, wherein the discovery response further comprises a period of time, and wherein the at least one memory and the computer program code are further configured to, with the at least one processor, cause the apparatus at least to:
store, for the period of time included in the discovery response, an association between the range of UE IP addresses and port managed by the network address and port translation service and the identifier of the network address and port translation service; and
use the association to determine the identifier of the network address and port translation service to serve subsequent address and port translation information requests.

* * * * *